(12) United States Patent
Peng et al.

(10) Patent No.: US 10,919,727 B2
(45) Date of Patent: Feb. 16, 2021

(54) PROCESS FOR KNOTTING ROVING PACKAGES

(71) Applicant: JUSHI GROUP CO., LTD., Tongxiang (CN)

(72) Inventors: Haijian Peng, Tongxiang (CN); Jiansong Shao, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 120 days.

(21) Appl. No.: 16/080,635

(22) PCT Filed: Jun. 19, 2017

(86) PCT No.: PCT/CN2017/088994
§ 371 (c)(1),
(2) Date: Aug. 28, 2018

(87) PCT Pub. No.: WO2018/149068
PCT Pub. Date: Aug. 23, 2018

(65) Prior Publication Data
US 2019/0084788 A1    Mar. 21, 2019

(30) Foreign Application Priority Data
Feb. 14, 2017    (CN) .......................... 201710077820.4

(51) Int. Cl.
*B65H 69/04*        (2006.01)
*B65H 51/22*        (2006.01)
(Continued)

(52) U.S. Cl.
CPC ............. *B65H 69/04* (2013.01); *B65D 85/04* (2013.01); *B65H 51/005* (2013.01); *B65H 51/22* (2013.01); *C03B 37/01* (2013.01); *B65H 2701/31* (2013.01)

(58) Field of Classification Search
CPC ........ B65H 69/00; B65H 69/02; B65H 69/04; B65H 51/005; B65H 51/015; B65H 51/22;
(Continued)

(56) References Cited

U.S. PATENT DOCUMENTS

| 1,465,359 | A |   | 8/1923 | Ashworth et al. |
| 2,209,203 | A | * | 7/1940 | Gustav Kahlisch ..... D02H 1/00 |
|           |   |   |        | 242/131.1 |

(Continued)

FOREIGN PATENT DOCUMENTS

| CN | 101671899 A | 3/2010 |
| CN | 201660552 U | 12/2010 |

(Continued)

OTHER PUBLICATIONS

Second Office action and search report from CN app. No. 201710077820.4, dated Sep. 19, 2019, with English translation from Global Dossier.

(Continued)

*Primary Examiner* — Ismael Izaguirre
(74) *Attorney, Agent, or Firm* — Ladas & Parry, LLP

(57) ABSTRACT

The present disclosure discloses a process for knotting roving packages, comprising steps of: arranging a plurality of roving packages in a single layer or multiple layers; classifying all roving packages into at least one group of roving packages; selecting, from each group of roving packages, two roving packages as a starting roving package and an ending roving package; successively connecting all roving packages in each group of roving packages from the starting roving package to the ending roving package; and, connecting an inner fiber of a roving package other than the starting roving package and the ending roving package in each group of roving packages to an outer fiber of a previous (Continued)

roving package and connecting an outer fiber of this roving package to an inner fiber of a next roving package, or connecting an outer fiber of a roving package other than the starting roving package and the ending roving package in each group of roving packages to an inner fiber of a previous roving package and connecting an inner fiber of this roving package to an outer fiber of a next roving package. By the process of the present disclosure, the labor cost for manually knotting and moving roving packages per unit can be saved, and creels for holding roving packages per unit can also be reduced. This process is a technical improvement of the packaging technology.

9 Claims, 3 Drawing Sheets

(51) Int. Cl.
    *B65D 85/04* (2006.01)
    *C03B 37/01* (2006.01)
    *B65H 51/005* (2006.01)
(58) Field of Classification Search
    CPC .......... B65H 2701/31; B65H 2701/312; B65H 2701/122; B65H 2701/313; B65H 2701/3132; B65H 16/00; B65H 16/02; B65H 16/021; B65H 19/02; B65H 19/18; B65H 19/1815; B65H 19/1857; B65H 19/1868; B65H 21/00; B65H 49/16; B65H 49/20; B65H 49/32; B65D 84/00; B65D 84/04; B65D 84/67; B65D 19/00; C03B 37/00; C03B 37/01; D01H 5/28; D01H 4/48; D01H 1/18; D01H 1/38; D01H 1/40
    See application file for complete search history.

(56) References Cited

U.S. PATENT DOCUMENTS

| | | | |
|---|---|---|---|
| 2,961,185 A | | 11/1960 | Seigle |
| 3,109,540 A | * | 11/1963 | Klimpl ............... B65D 71/0096 242/129 |
| 3,160,365 A | * | 12/1964 | Barnett, Jr. ............ B65D 85/62 242/128 |
| 3,915,301 A | * | 10/1975 | Gray ...................... B65H 49/08 206/409 |
| 4,022,396 A | | 5/1977 | Manchester et al. |
| 4,073,450 A | | 2/1978 | Carlsson et al. |
| 4,673,140 A | | 6/1987 | Boles |
| 4,836,468 A | | 6/1989 | Singer |
| 5,129,593 A | | 7/1992 | Smith |
| 5,551,563 A | * | 9/1996 | Allen ................ B65D 71/0096 206/394 |
| 8,177,154 B1 | | 5/2012 | Hoover |
| 2003/0122009 A1 | | 7/2003 | Abba et al. |
| 2004/0195426 A1 | | 10/2004 | Lock |
| 2015/0108036 A1 | * | 4/2015 | Sakaguchi ......... B65D 71/0096 206/597 |
| 2015/0225203 A1 | | 8/2015 | Hoover |
| 2019/0084788 A1 | | 3/2019 | Peng et al. |

FOREIGN PATENT DOCUMENTS

| | | |
|---|---|---|
| CN | 202000046 U | 10/2011 |
| CN | 203613347 U | 5/2014 |
| CN | 204416765 U | 6/2015 |
| CN | 105540334 A | 5/2016 |
| CN | 105908352 A | 8/2016 |
| CN | 105951256 A | 9/2016 |
| CN | 205687277 U | 11/2016 |
| DE | 2541051 A1 | 3/1977 |
| DE | 4239731 A1 | 6/1994 |
| EP | 1422179 A2 * | 5/2004 |
| EP | 3569536 A1 | 6/2017 |
| JP | S4866988 U | 8/1973 |
| JP | S5375390 U | 6/1978 |
| JP | S58102482 U | 7/1983 |
| JP | 6015370 A | 1/1985 |
| JP | 04235865 A | 8/1992 |
| JP | 2016172563 A | 9/2016 |
| JP | 2016222431 A | 12/2016 |
| WO | 2018149068 A1 | 8/2018 |

OTHER PUBLICATIONS

Written Opinion of the International Searching Authority from PCT/CN2017/088994, dated Oct. 12, 2017, with English translation from WIPO.
International Preliminary Report on Patentability from PCT/CN2017/088994, dated Aug. 20, 2019, with English translation from WIPO.
First Office Action and Search Report from CN app. No. 201710077820. 4, dated Mar. 5, 2019, with English translation provided by ESPACENET.
International Search Report for PCT/CN2017/088994 dated Oct. 12 2017 and its English translation provided by WIPO.
Written Opinion of the International Search Authority PCT/CN2017/088994 dated Oct. 12, 2017 and its English translation provided by Google Translate.
Notie of Reasons for Refusal for JP app No. 2019-513315, dated Mar. 3, 2020, with English translation from Global Dossier.
Office action from CA app. 3034147, dated Jan. 29, 2020.
Decision to Grant a Patent from JP app. No. 2019513315, dated Jul. 7, 2020 with English translation from Global Dossier.
Notification of Reason for Refusal from KR app. No. 10-2019-7004778, dated Oct. 29, 2019, with English translation from Global Dossier.
Notification of Reason for Refusal from KR app. No. 10-2019-7004778, dated Apr. 23, 2020, with English translation from Global Dossier.

* cited by examiner

PROCESS FOR KNOTTING ROVING PACKAGES

CROSS-REFERENCE TO RELATED APPLICATIONS

The present application is the U.S. national phase of PCT Application PCT/CN2017/088994 filed on Jun. 19, 2017 which claims priority to Chinese Patent Application No. 201710077820.4 filed to the State Intellectual Property Office on Feb. 14, 2017 and entitled "PROCESS FOR KNOTTING ROVING PACKAGES", the disclosure of which incorporated herein by reference in their entireties.

TECHNICAL FIELD OF THE PRESENT INVENTION

The present disclosure relates to a process for knotting and connecting fibers, and in particular to a process for knotting roving packages.

BACKGROUND OF THE PRESENT INVENTION

During the production of glass fiber rovings, generally, after the winding procedure is completed, roving packages need to be conveyed to a next packaging procedure by a conveyor chain. Generally, glass fiber roving packages are packed in the following ways: multiple roving packages are placed on a pallet and packaged integrally, or a single roving package is put in a carton and then placed on a pallet and packaged integrally. In the two packaging ways, a single roving package or a plurality of roving packages needs to be knotted for the purpose of fixation. Usually, during the integral packaging of glass fiber roving packages on a pallet, the roving packages need to be stacked on a pallet in a combination of 3*3, 3*4, 4*4, 4*5 or other similar combinations, so that there are 9, 12, 16, 20 or another number of roving packages arranged in each layer. As shown in FIG. 1 (self-knotted roving packages), the roving packages on the pallet are arranged individually. In FIG. 1, A represents an inner fiber of an individual roving package, and B represents an outer fiber of the individual roving package. In the prior art, in majority of integral packaging methods, manual knotting or knotting by an air splicer is employed, wherein the head and tail of a single roving package are connected and knotted by the air splicer, that is, a fiber at the position A and a fiber at the position B of an individual roving package are knotted, and the roving packages are stacked successively according to conventional requirements. The method for knotting the head and tail of an individual roving package is common, and is mainly aimed at avoiding the falling-off of an inner layer of the roving package, so that the placement position of the roving package can be managed conveniently. For some downstream manufacturers using glass fiber roving packages, it is necessary, when in use, to take roving packages down from a pallet, then place the roving packages in a creel or in an equipment region one by one, and successively complete the operations of finding ends and knotting. Such long-term operations will influence the improvement of the production efficiency; increase the labor cost, or even increase the defect rate of the subsequently produced products. Meanwhile; for an individual roving package in use, since the length of the fiber of this roving package is limited, workers need to move the roving packages and find ends of the roving packages for multiple times during the continuous production. In doing so, it is both time and labor consuming, and it is disadvantageous for practical industrial production.

SUMMARY OF THE PRESENT INVENTION

In view of the defects in the prior art, the present disclosure provides a process for knotting multiple roving packages, which can increase the total length of glass fiber fibers, solve the problems of moving the roving packages and finding ends of the roving packages for multiple times during the production and thus being both time and labor consuming; and accordingly improve the production efficiency.

The present disclosure provides a process for knotting roving packages, including steps of: arranging a plurality of roving packages in a single layer or multiple layers; dividing all roving packages into at least one group of roving packages; selecting, from each group of roving packages, two roving packages as a starting roving package and an ending roving package; successively connecting all roving packages in each group of roving packages from the starting roving package to the ending roving package; and, connecting an inner fiber of a roving package other than the starting roving package and the ending roving package in each group of roving packages to an outer fiber of a previous roving package and connecting an outer fiber of this roving package to an inner fiber of a next roving package, or connecting an outer fiber of a roving package other than the starting roving package and the ending roving package in each group of roving packages to an inner fiber of a previous roving package and connecting an inner fiber of this roving package to an outer fiber of a next roving package.

The process for knotting roving packages is further characterized in that:

during the successive connection of all roving packages in each group of roving packages, two roving packages at adjacent positions in a same layer are connected, and/or two roving packages in a same column and in different layers are connected.

The process for knotting roving packages is further characterized in that:

the starting roving package and the ending roving package as starting positions in a group of roving packages are any two roving packages in this group of roving packages.

The process for knotting roving packages is further characterized in that:

when the roving packages are arranged in a single layer, the numbers of the roving packages in each row are the same or not completely the same, and the numbers of the roving packages in each column are the same or not completely the same; and, each group of roving packages includes at least one row of roving packages, wherein a group of roving packages including more than one row of roving packages includes multiple rows of roving packages connected successively; or, each group of roving packages includes at least one column of roving packages, wherein a group of roving packages including more than one column of roving packages includes multiple columns of roving packages connected successively.

The process for knotting roving packages is further characterized in that:

when the roving packages are arranged in multiple layers, the numbers of the roving packages in each layer are the same or not completely the same, and the arrangement modes of the roving packages in each layer are the same or not completely the same, wherein each group of roving packages includes at least one row of roving packages belonging to a same layer or at least two adjacent rows of roving packages belonging to different adjacent layers, or each group of roving packages includes at least one row of roving packages belonging to a same layer or at least two adjacent columns of roving packages belonging to different adjacent layers.

The process for knotting roving packages is further characterized in that:

when all roving packages are arranged in a same layer, all the roving packages form an rectangle having M rows and N columns, wherein both M and N are integers greater than 1, and all the roving packages are divided into X groups, wherein X is an integer less than or equal to (M*N)/2; and, when all the roving packages are arranged in Y layers, the roving packages in each layer form an rectangle having M rows and N columns, wherein M, N and Y are all integers greater than 1, and all the roving packages are divided into X groups, wherein X is an integer less than or equal to (M*N*Y)/2.

The process for knotting roving packages is further characterized in that:

the successive connection of all roving packages in a same layer in each group of roving packages is realized by serpentine wiring or irregular wiring.

The process for knotting roving packages is further characterized in that:

when the roving packages in a group belong to a same layer, the roving packages in this group form an rectangle having M rows and N columns, wherein both M and N are integers greater than 1; when M is an even number, a roving package in the first row and the first column is a starting roving package, and a roving package in the $M^{th}$ row and the first column is an ending roving package; and, when M is an odd number, a roving package in the first row and the first column is a starting roving package, and a roving package in the $M^{th}$ row and the $N^{th}$ column is an ending roving package.

The process for knotting roving packages is further characterized in that:

when the roving packages in a group belong to multiple layers, at least one layer connecting roving package used for interlayer connection is included in each layer; an inner fiber of the layer connecting roving package is connected to an outer fiber of the successively connected roving packages in the layer which the layer connecting roving package belongs to, while an outer fiber of the layer connecting roving package is connected to an inner fiber of a layer connecting roving package in an adjacent layer; or, the outer fiber of the layer connecting roving package is connected to an inner fiber of the serially connected roving packages in the layer which the layer connecting roving package belongs to, while the inner fiber of the layer connecting roving package is connected to an outer fiber of a layer connecting roving package in an adjacent layer.

The process for knotting roving packages is further characterized in that:

the roving packages in each group of roving packages are successively connected in any one or a combination of the following ways: knotting manually, knotting by a knotting device, connecting by glue.

Compared with the existing packaging process in which each of a plurality of roving packages is knotted at its respective head and tail and they are then placed on a pallet, in the present disclosure, a plurality of roving packages are sequentially connected by a certain knotting process, so that the roving packages form continuous glass fiber ravings having a pair of fiber ends or at least two fiber ends.

Accordingly, the labor cost for manually knotting and moving roving packages for one person can be saved, and creels for holding roving packages for per unit space can also be reduced. This process is a technical improvement of the packaging technology. In practical applications, the fibers on the whole pallet can be used continuously and smoothly from an inner fiber end of a first roving package to an outer fiber end of the last roving package, without consuming additional labor cost. Further, in practical applications, the labor cost for one person and the equipment cost for one equipment can be reduced and the efficiency is improved. Therefore, this process is a feasible solution suitable for industrial applications.

BRIEF DESCRIPTION OF THE DRAWINGS

The accompanying drawings described herein are used for providing further understanding of the present disclosure and constitute part of the present application. Illustrative embodiments of the present disclosure and descriptions thereof are merely provided for explaining the present disclosure, instead of forming any improper limitations to the present disclosure. In the accompanying drawings.

DETAILED DESCRIPTION OF THE PRESENT INVENTION

To make the objectives, technical solutions and advantages of the embodiments of the present disclosure clearer, the technical solutions in the embodiments of the present disclosure will be described below clearly and completely with reference to the accompanying drawings in the embodiments of the present disclosure. Apparently, the described embodiments are just some but not all of the embodiments of the present disclosure. All other embodiments obtained by a person of ordinary skill in the art without paying any creative effort on the basis of the embodiments in the present disclosure shall fall into the protection scope of the present disclosure. It is to be noted that the embodiments in the present application and the features in the embodiments can be combined at will if not conflict.

Figure 1:
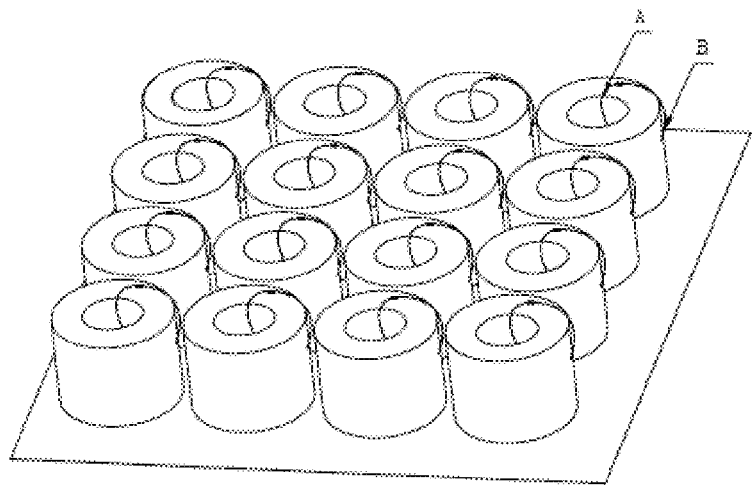
FIG. 1 is a schematic view of a method for knotting the head and tail of a roving package in the prior art.
Figure 2:
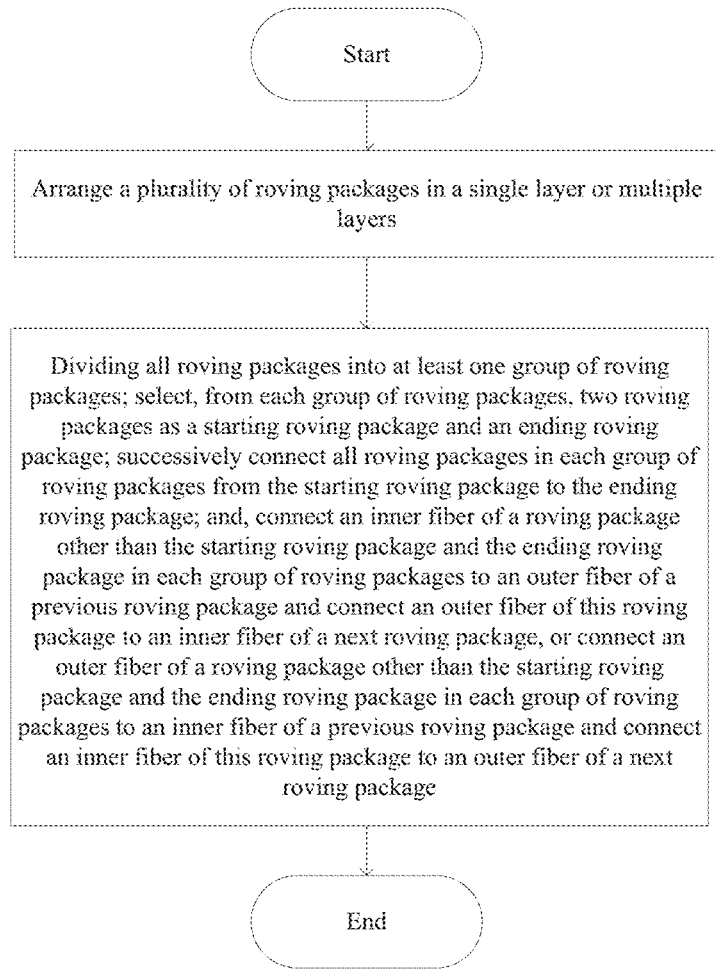
FIG. 2 is a flowchart of a process for knotting a plurality of roving packages according to an embodiment.

FIG. 2 shows a flowchart of a process for knotting roving packages according to an embodiment. This process includes steps of: arranging a plurality of roving packages in a single layer or multiple layers; dividing all roving packages into at least one group of roving packages; selecting, from each group of roving packages, two roving packages as a starting roving package and an ending roving package; successively connecting all roving packages in each group of roving packages from the starting roving package to the ending roving package; and, connecting an inner fiber of a roving package in each group of roving packages to an outer fiber of a previous roving package and connecting an outer fiber of this roving package to an inner fiber of a next roving package, wherein this roving package, its previous fiber and its next fiber are not the starting roving package and the ending roving package, or connecting an outer fiber of a roving package in each group of roving packages to an inner fiber of a previous roving package and connecting an inner fiber of this roving package to an outer fiber of a next roving package, wherein this roving package, its previous fiber and its next fiber are not the starting roving package and the ending roving package.

Wherein:

In the present disclosure, the number of roving packages is greater than or equal to 2. The number of strands in each fiber end of each roving package is greater than or equal to 1. All the roving packages can be divided into X groups, wherein X is greater than or equal to 1. Each group of roving packages are connected separately, and fibers of roving packages in different groups are not crisscrossed. Roving packages in each group of roving packages are successively connected in any one or a combination of the following ways: knotting manually, knotting by a knotting device, connecting by glue, etc.

During the successive connection of all roving packages in each group of roving packages, two roving packages at adjacent positions in a same layer are connected, and/or two roving packages in a same column in different layers are connected.

The starting roving package and the ending roving package as starting positions in a group of roving packages are any two roving packages in this group of roving packages.

When roving packages are arranged in a single layer, the numbers of roving packages in each row are the same or not completely the same, and the numbers of roving packages in each column are the same or not completely the same. In applications, as a typical arrangement mode, the numbers of roving packages in each row are the same, and the numbers of roving packages in each column are the same. However, the present disclosure is not limited thereto, and different arrangement modes are also possible, where the numbers of roving packages in different rows are different and the numbers of roving packages in different columns are different. The arrangement shape of the roving packages includes, but is not limited to, rectangle. As a typical arrangement shape, when all roving packages are arranged in a same layer, all the roving packages form an rectangle having M rows and N columns, wherein both M and N are integers greater than 1, and all the roving packages are divided into X groups, wherein X is an integer less than or equal to (M*N)/2.

During the grouping of the roving packages arranged in a single layer, the grouping method includes, but is not limited to, the following way: each group of roving packages includes at least one row of roving packages, wherein a group of roving packages including more than one row of roving packages includes multiple rows of roving packages connected successively; or, each group of roving packages includes at least one column of roving packages, wherein a group of roving packages including more than one column of roving packages includes multiple columns of roving packages connected successively. During the grouping of the roving packages arranged in a single layer, the numbers of roving packages included in each group of roving packages may be the same or different.

For example, all roving packages are arranged in a rectangle having 4 rows and 5 columns, and the roving packages arranged in a single layer are divided into 3 groups, wherein the first group of roving packages includes roving packages in the first row, the second group of roving packages includes roving packages in the second row and the third row, and the third group of roving packages includes roving packages in the fourth row.

When the roving packages are arranged in multiple layers, the numbers of roving packages in each layer are the same or not completely the same, and the arrangement mode of roving packages in each layer is the same or not completely the same. In applications, as a typical arrangement mode, the number of roving packages in each layer is the same, and the arrangement mode of roving packages in each layer is the same. However, the present disclosure is not limited thereto, and other modes are also possible, where the numbers of roving packages in different rows are different and the numbers of roving packages in different columns are different. As a typical arrangement shape, when all roving packages are arranged in Y layers, the roving packages in each layer form an rectangle having M rows and N columns, wherein M, N and Y are all integers greater than 1, all the roving packages are divided into X groups, and X is an integer less than or equal to (M*N*Y)/2.

During the grouping of the roving packages arranged in multiple layers, each group of roving packages includes at least one row of roving packages belonging to a same layer or at least two adjacent rows of roving packages belonging to different adjacent layers, or each group of roving packages includes at least one row of roving packages belonging to a same layer or at least two columns of roving packages belonging to different adjacent layers. During the grouping of the roving packages arranged in a single layer, the numbers of roving packages contained in each group of roving packages may be the same or different. The roving packages divided in each group of roving packages may belong to only one layer or multiple layers.

For example; all the roving packages are arranged in two layers, the roving packages in each layer are arranged in a rectangle having 4 rows and 5 columns, and the roving packages are divided into 3 groups, wherein the first group of roving packages includes roving packages in first rows in the first layer and in the second layer, the second group of roving packages includes roving packages in the second and third rows in the first layer and in the second layer, and the third group of roving packages includes roving packages in fourth rows in the first layer and in the second layer.

When the roving packages in a group belong to multiple layers, at least one layer connecting roving package used for interlayer connection is included in each layer; an inner fiber of the layer connecting roving package is connected to an outer fiber of the successively connected roving packages in the same layer, while an outer fiber of the layer connecting roving package is connected to an inner fiber of a layer connecting roving package in an adjacent layer; or, the outer fiber of the layer connecting roving package is connected to an inner fiber of the serially connected roving packages in the same layer, while the inner fiber of the layer connecting roving package is connected to an outer fiber of a layer connecting roving package in an adjacent layer.

Whether all the roving packages are arranged in a single layer or in multiple layers, the successive connection of all roving packages in a same layer in each group of roving packages is realized by serpentine wiring or irregular wiring.

All ways for successively and serially connecting all roving packages in a group of roving packages in various shapes shall fall into the protection scope of the present disclosure.

As a typical arrangement mode, when roving packages in a group belong to a same layer, the roving packages in this group form a rectangle having M rows and N columns, wherein both M and N are integers greater than 1; when M is an even number, a roving package in the first row and the first column is a starting roving package, and a roving package in the $M^{th}$ row and the first column is an ending roving package; and, when M is an odd number, a roving package in the first row and the first column is a starting roving package, and a roving package in the $M^{th}$ row and the $N^{th}$ column is an ending roving package. The serial connection of the roving packages from the starting roving package to the ending roving package is Serpentine connection. For example, in the serial connection from the starting roving package to the ending roving package, except for the roving packages in the first column and the $N^{th}$ column in each row, an inner fiber of a roving package is connected to an outer fiber of an adjacent roving package in this row, while an outer fiber of this roving package is connected to an inner fiber of another adjacent roving package in this row. An inner fiber of a roving package in the first column and the $N^{th}$ column, expect for the starting roving package and the ending roving package, is connected to an outer fiber of an adjacent roving package in the same row, while an outer fiber of this roving package is connected to an inner fiber of a roving package in a previous adjacent row or a next adjacent row and also in the same column; or, an outer fiber of a roving package in the first column and the $N^{th}$ column, expect for the starting roving package and the ending roving package, is connected to an inner fiber of an adjacent roving package in the same row, while an inner fiber of this roving package is connected to an outer fiber of a roving package in a previous adjacent row or a next adjacent row and also in the same column.

The present disclosure will be described below in detail by taking four specific embodiments as example.

First Specific Embodiment

Figure 3:
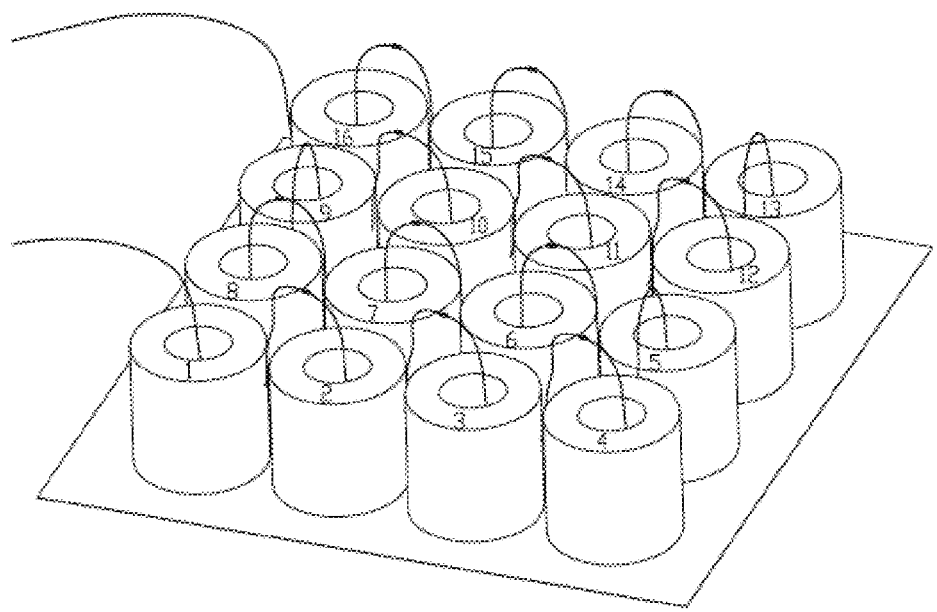
FIG. 3 is a schematic view of a knotting method by which roving packages are placed on a pallet in a same layer and classified into one group, according to a first specific embodiment.

As shown in FIG. 3, in this specific embodiment; roving packages are arranged on a pallet in a same layer; and all the roving packages are divided into one group. After all the roving packages are connected in series, there are a starting fiber and an ending fiber.

There are totally 16 roving packages, including a roving package 1, a roving package 2, a roving package 3, . . . , a roving package 16, and the roving packages are arranged on a pallet in a same layer in 4 rows and 4 columns. The roving package 1 is a starting roving package, and the roving package 16 is an ending roving package.

An outer fiber of the roving package 1 is connected to an inner fiber of the roving package 2; an outer fiber of the roving package 2 is connected to an inner fiber of the roving package 3; an outer fiber of the roving package 3 is connected to an inner fiber of the roving package 4; an outer fiber of the roving package 4 is connected to an inner fiber of the roving package 5; an outer fiber of the roving package 5 is connected to an inner fiber of the roving package 6; and, by that analogy and in an serpentine wiring manner, an outer fiber of the roving package 15 is connected to an inner fiber of the roving package 16, so that the 16 roving packages are connected successively. Since the fiber of the roving package 1 is a unique independent and unknotted inner fiber in this layer of roving packages, this fiber can be used as a starting fiber. Since the outer fiber of the roving package 16 is a unique independent and unknotted outer fiber in this layer of roving packages, this outer fiber can be used as an ending fiber.

Second Specific Embodiment

Figure 4:
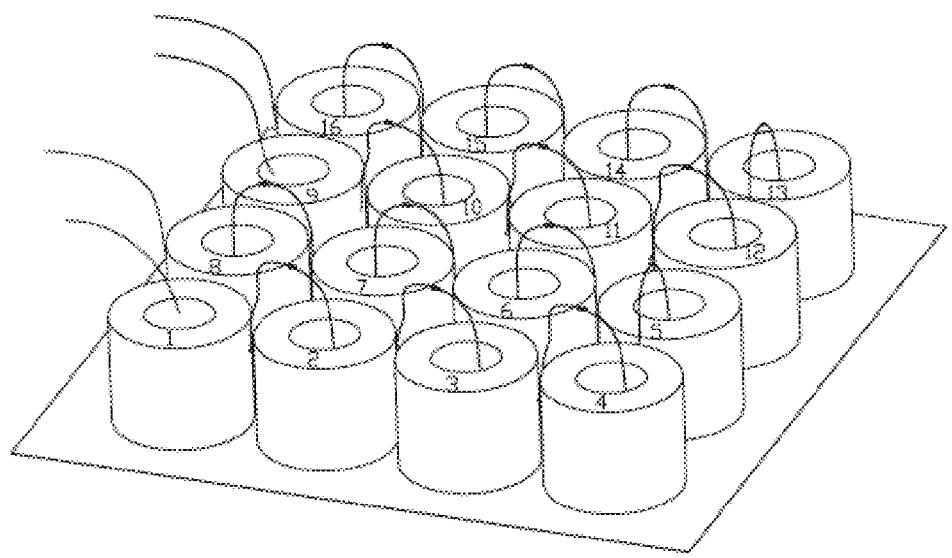
FIG. 4 is a schematic view of a knotting method by which roving packages are placed on a pallet in a same layer and classified into two groups, according to a second specific embodiment.

As shown in FIG. 4, in this specific embodiment, roving packages are arranged on a pallet in a same layer, and all the roving packages are divided into two groups. After all the roving packages are connected in series, there are two starting fibers and two ending fibers.

There are totally 16 roving packages, including a roving package 1, a roving package 2, a roving package 3, . . . , and a roving package 16, and the roving packages are arranged on a pallet in a same layer in 4 rows and 4 columns. A roving package 1, a roving package 2, a roving package 3, . . . , and a roving package 8 are divided into a first group. The roving package 1 is a starting roving package in this group, and the roving package 8 is a starting roving package in this group. After the roving packages in this group are connected in series, there are a starting fiber and an ending fiber. A roving package 9, a roving package 10, a roving package 11, . . . , and a roving package 16 are divided into a second group. The roving package 9 is a starting roving package in this group, and the roving package 16 is a starting roving package in this group. After the roving packages in this group are connected in series, there are a starting fiber and an ending fiber.

An outer fiber of the roving package 1 is connected to an inner fiber of the roving package 2; an outer fiber of the roving package 2 is connected to an inner fiber of the roving package 3; an outer fiber of the roving package 3 is connected to an inner fiber of the roving package 4; an outer fiber of the roving package 4 is connected to an inner fiber of the roving package 5; and, by that analogy and in an serpentine wiring manner, an outer fiber of the roving package 7 is connected to an inner fiber of the roving package 8, so that the 8 roving packages in the first group are connected successively. Since the fiber of the roving package 1 is a unique independent and unknotted inner fiber in the first group of roving packages, this fiber can be used as a first starting fiber. Since the outer fiber of the roving package 8 is a unique independent and unknotted outer fiber in this layer of roving packages, this outer fiber can be used as a first ending fiber.

In a similar way, the 8 roving packages in the second group are successively connected in a serpentine serial connection manner. Since the fiber of the roving package 9 is a unique independent and unknotted inner fiber in the second group of roving packages, this fiber can be used as a second starting fiber. Since the outer fiber of the roving package 16 is a unique independent and unknotted outer fiber in this layer of roving packages, this outer fiber can be used as a second ending fiber.

Third Specific Embodiment

Figure 5:
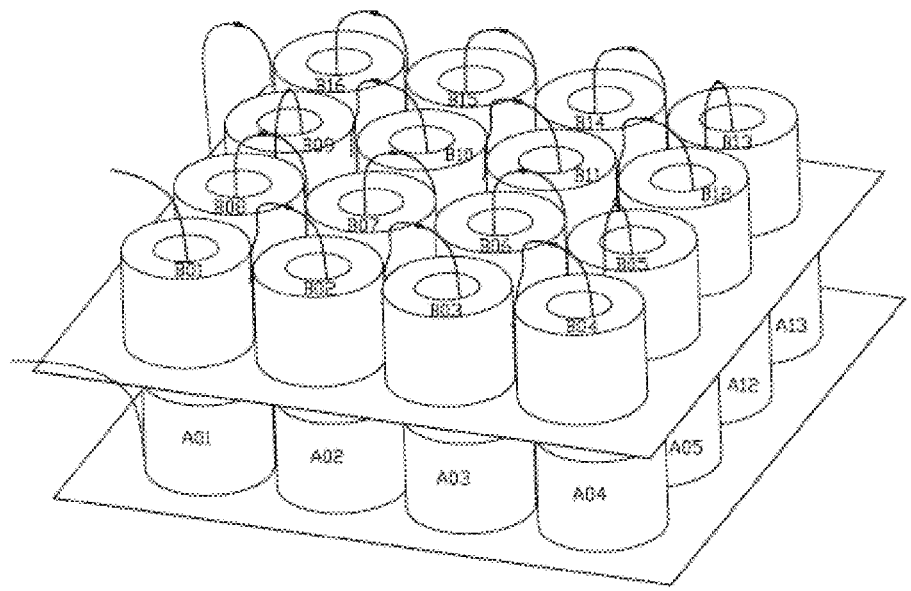
FIG. 5 is a schematic view of a knotting method by which roving packages are arranged on pallets in two layers and classified into one group, according to a third specific embodiment.

As shown in FIG. 5, in this specific embodiment, roving packages are arranged on pallets in two layers, and all the roving packages are divided into one group. After all the roving packages are connected in series, there are a starting fiber and an ending fiber.

An inner fiber of the roving package A01 in the layer A is connected to an outer fiber of the roving package A02 in the layer A; an inner fiber of the roving package A02 in the layer A is connected to an outer fiber of the roving package A03 in the layer A; an inner fiber of the roving package A03 in the layer A is connected to an outer fiber of the roving package A04 in the layer A; an inner fiber of the roving package A04 in the layer A is connected to an outer fiber of the roving package A05 in the layer A; and; by that analogy and in an serpentine wiring manner, an inner fiber of the roving package A15 in the layer A is connected to an outer fiber of the roving package A16 in the layer A.

The roving package A16 in the layer A and the roving package B16 in the layer B are layer connecting roving packages, and an inner fiber of the roving package A16 in the layer A is connected to an outer fiber of the roving package B16 in the layer B, so as to connect the roving packages in the layer A with the roving packages in the layer B. The roving packages in the layer B are connected in a way similar to the connection way of the roving packages in the layer A.

Since the outer fiber of the roving package A01 in the layer A is a unique independent and unknotted outer fiber in this layer of roving packages; this fiber is used as a starting fiber; and, since the outer fiber of the roving package B01 in the layer B is a unique independent and unknotted outer fiber in this layer of roving packages; this fiber is used as an ending fiber.

Fourth Specific Embodiment

Figure 6:
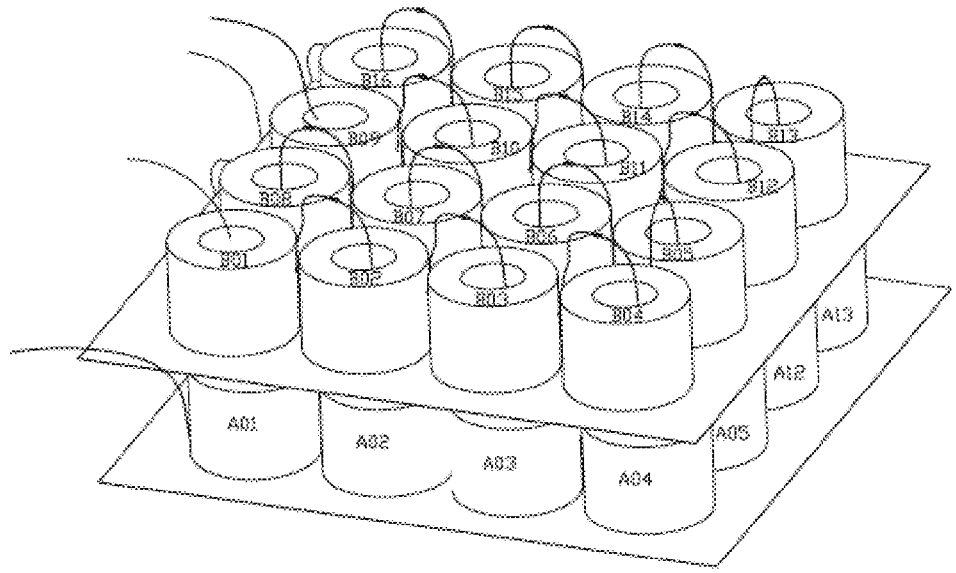
FIG. 6 is a schematic view of a knotting method by which roving packages are arranged on pallets in two layers and classified into two groups, according to a fourth specific embodiment.

As shown in FIG. 6, in this specific embodiment, roving packages are arranged on pallets in two layers, and all the roving packages are divided into two groups. After all the roving packages are connected in series, there are two starting fibers and two ending fibers.

The first group of roving packages includes roving packages A01, A02, A03, ..., A08 in the layer A and roving packages B01, B02, B03, ..., B08 in the layer B. An inner fiber of the roving package A01 in the layer A is connected to an outer fiber of the roving package A02 in the layer A; an inner fiber of the roving package A02 in the layer A is connected to an outer fiber of the roving package A03 in the layer A; and; by that analogy and in an serpentine wiring manner; an inner fiber of the roving package A07 in the layer A is connected to an outer fiber of the roving package A08 in the layer A. An inner fiber of the roving package A08 in the layer A is connected to an outer fiber of the roving package B08 in the layer B to connect the layer A with the layer B. The roving packages B08, B07, B06, ..., B01 in the layer B are connected in a way similar to the connection way of the roving packages in the layer A. In the first group of roving packages, the outer fiber of the roving package A01 is used as a first starting fiber, and the inner fiber of the roving package B01 is used as a second starting fiber.

The second group of roving packages includes roving packages A09, A10, A11, ..., A16 in the layer A and roving packages B09, B10, B 11, ..., B16 in the layer B. The roving packages in the second group are connected in a similar way. In the second group of roving packages, the outer fiber of the roving package A09 is used as a second starting fiber, and the inner fiber of the roving package B09 is used as a second starting fiber.

In the specific embodiments, the numbers of rows/columns of the rectangle formed by the roving packages in each layer, the numbers of layers of roving packages and the connection orders of the roving packages, the numbers of roving packages A01 to A06 or B01 to B16 are merely illustrative, and any other combination of the numbers of roving packages, the numbers of layers and the orders can be used in the present disclosure.

Compared with the existing packaging process in which for a plurality of roving packages, the head and tail of a same roving package are knotted and the plurality of roving packages are then placed on a pallet, in the present disclosure, a plurality of roving packages are sequentially connected by a certain knotting process, so that the roving packages form continuous glass fiber rovings having a pair of fiber ends or at least two fiber ends. Accordingly, the labor cost for manually knotting and moving roving packages for one person can be saved, and creels for holding roving packages for per unit space can also be reduced. This process is a technical improvement of the packaging technology. In practical applications, the fibers on the whole pallet can be used continuously and smoothly from an inner fiber end of a first roving package to an outer fiber end of the last roving package, without consuming additional labor cost. Further, in practical applications, the labor cost for one person and the equipment cost for one equipment can be reduced and the efficiency is improved. Therefore, this process is a feasible solution suitable for industrial applications.

In addition, it is to be noted that the shapes and names of components and parts in the specific embodiments described herein can be different, and the contents of the description are merely for illustrating the structure of the present disclosure.

The contents described above can be implemented separately or jointly in various ways, and these transformations shall fall into the protection scope of the present disclosure.

As used herein, the term "comprise/comprising", "contain/containing" or any other variants thereof is non-exclusive, so that an object or a device containing a series of elements contains not only these elements, but also other elements not listed clearly, or further contains inherent elements of the object or device. Unless otherwise defined herein, an element defined by the statement "comprises/comprising an/a . . . " does not exclude other identical elements in the object or device including this element.

The foregoing embodiments are merely used for describing the technical solutions of the present disclosure, and the present disclosure has been described in detail just by preferred embodiments. It should be understood by a person of ordinary skill in the art that modifications or equivalent replacements can be made to the technical features of the present disclosure without departing from the spirit and scope of the technical solutions of the present disclosure, and these modifications or equivalent replacements shall fall into the scope defined by the appended claims of the present disclosure.

INDUSTRIAL APPLICABILITY

In the present disclosure, a plurality of roving packages are allowed to form continuous glass fiber rovings having a pair of fiber ends or at least two fiber ends, so that the labor cost for manually knotting and moving roving packages for one person can be saved, and creels for holding roving packages for per unit space can also be reduced. Therefore, this process is a technical improvement of the packaging technology.

The invention claimed is:

1. A process for knotting roving packages, comprising steps of: arranging a plurality of roving packages in a single layer or multiple layers; dividing all roving packages into at least one group of roving packages; selecting, from each group of roving packages, two roving packages as a starting roving package and an ending roving package; successively connecting all roving packages in each group of roving packages from the starting roving package to the ending roving package; and, connecting an inner fiber of a roving package other than the starting roving package and the ending roving package in each group of roving packages to an outer fiber of a previous roving package and connecting an outer fiber of this roving package to an inner fiber of a next roving package, or connecting an outer fiber of a roving package other than the starting roving package and the ending roving package in each group of roving packages to an inner fiber of a previous roving package and connecting an inner fiber of this roving package to an outer fiber of a next roving package; wherein, when the roving packages are arranged in a single layer, the numbers of the roving packages in each row are the same or not completely the same, and the numbers of the roving packages in each column are the same or not completely the same; and each group of roving packages includes at least one row of roving packages, wherein a group of roving packages including more than one row of roving packages includes multiple rows of roving packages connected successively; or, each group of roving packages includes at least one column of roving packages, wherein a group of roving packages including more than one column of roving packages includes multiple columns of roving packages connected successively.

2. The process for knotting roving packages according to claim 1, wherein, during the successive connection of all roving packages in each group of roving packages, two roving packages at adjacent positions in a same layer are connected, and/or two roving packages in a same column and in different layers are connected.

3. The process for knotting roving packages according to claim 1, wherein, the starting roving package and the ending roving package as starting positions in a group of roving packages are any two roving packages in this group of roving packages.

4. The process for knotting roving packages according to claim 1, wherein, when the roving packages are arranged in multiple layers, the numbers of the roving packages in each layer are the same or not completely the same, and the arrangement modes of the roving packages in each layer are the same or not completely the same;

wherein each group of roving packages includes at least one row of roving packages belonging to a same layer or at least two adjacent rows of roving packages belonging to different adjacent layers, or each group of roving packages includes at least one row of roving packages belonging to a same layer or at least two adjacent columns of roving packages belonging to different adjacent layers.

5. A process for knotting roving packages, comprising steps of: arranging a plurality of roving packages in a single layer or multiple layers; dividing all roving packages into at least one group of roving packages; selecting, from each group of roving packages, two roving packages as a starting roving package and an ending roving package; successively connecting all roving packages in each group of roving packages from the starting roving package to the ending roving package; and, connecting an inner fiber of a roving package other than the starting roving package and the ending roving package in each group of roving packages to an outer fiber of a previous roving package and connecting an outer fiber of this roving package to an inner fiber of a next roving package, or connecting an outer fiber of a roving package other than the starting roving package and the ending roving package in each group of roving packages to an inner fiber of a previous roving package and connecting an inner fiber of this roving package to an outer fiber of a next roving package; wherein, when all roving packages are arranged in a same layer, all the roving packages form an rectangle having M rows and N columns, wherein both M and N are integers greater than 1, and all the roving packages are divided into X groups, wherein X is an integer less than or equal to $(M*N)/2$; and when all the roving packages are arranged in Y layers, the roving packages in each layer form an rectangle having M rows and N columns, wherein M, N and Y are all integers greater than 1, and all the roving packages are divided into X groups, wherein X is an integer less than or equal to $(M*N*Y)/2$.

6. The process for knotting roving packages according to claim 1, wherein, the successive connection of all roving packages in a same layer in each group of roving packages is realized by serpentine wiring or irregular wiring.

7. A process for knotting roving packages, comprising steps of: arranging a plurality of roving packages in a single layer or multiple layers; dividing all roving packages into at least one group of roving packages; selecting, from each group of roving packages, two roving packages as a starting roving package and an ending roving package; successively connecting all roving packages in each group of roving packages from the starting roving package to the ending roving package; and, connecting an inner fiber of a roving package other than the starting roving package and the ending roving package in each group of roving packages to an outer fiber of a previous roving package and connecting an outer fiber of this roving package to an inner fiber of a next roving package, or connecting an outer fiber of a roving package other than the starting roving package and the ending roving package in each group of roving packages to an inner fiber of a previous roving package and connecting an inner fiber of this roving package to an outer fiber of a next roving package; wherein, when the roving packages in a group belong to a same layer, the roving packages in this group form an rectangle having M rows and N columns, wherein both M and N are integers greater than 1; when M is an even number, a roving package in the first row and the first column is a starting roving package, and a roving package in the $M^{th}$ row and the first column is an ending roving package; and, when M is an odd number, a roving package in the first row and the first column is a starting roving package, and a roving package in the $M^{th}$ row and the $N^{th}$ column is an ending roving package.

8. The process for knotting roving packages according to claim 1, wherein, when the roving packages in a group belong to multiple layers, at least one layer connecting roving package used for interlayer connection is included in each layer; an inner fiber of the layer connecting roving package is connected to an outer fiber of the successively connected roving packages in the layer which the layer connecting roving package belongs to, while an outer fiber of the layer connecting roving package is connected to an inner fiber of a layer connecting roving package in an adjacent layer; or, the outer fiber of the layer connecting roving package is connected to an inner fiber of the serially connected roving packages in the layer which the layer connecting roving package belongs to, while the inner fiber of the layer connecting roving package is connected to an outer fiber of a layer connecting roving package in an adjacent layer.

9. The process for knotting roving packages according to claim 1, wherein, the roving packages in each group of roving packages are successively connected in any one or a combination of the following ways: knotting manually, knotting by a knotting device, connecting by glue.

* * * * *